United States Patent [19]

Schembri

[11] Patent Number: 4,946,244
[45] Date of Patent: Aug. 7, 1990

[54] FIBER OPTIC DISTRIBUTION SYSTEM AND METHOD OF USING SAME

[75] Inventor: John J. Schembri, Danville, Calif.
[73] Assignee: Pacific Bell, San Francisco, Calif.
[21] Appl. No.: 322,529
[22] Filed: Mar. 13, 1989

Related U.S. Application Data

[63] Continuation-in-part of Ser. No. 34,087, Apr. 2, 1987, Pat. No. 4,871,225.

[51] Int. Cl.⁵ .......................... G02B 6/28; G02F 1/00; H04B 9/00
[52] U.S. Cl. .............................. 350/96.16; 350/96.20; 350/96.21; 350/96.22; 350/320; 455/606; 455/612; 455/617; 370/3
[58] Field of Search ............... 350/96.15, 96.16, 96.21, 350/96.20, 96.22, 320, 96.23; 370/1, 3, 4, 85, 86, 87, 88, 89; 250/227.11; 455/601, 600, 602, 606, 603, 607, 604, 612, 617

[56] References Cited

U.S. PATENT DOCUMENTS

| | | | |
|---|---|---|---|
| 4,186,380 | 1/1980 | Edwin et al. | 455/612 X |
| 4,501,021 | 2/1985 | Weiss | 455/612 X |
| 4,686,667 | 8/1987 | Ohnsorge | 370/4 |
| 4,704,713 | 11/1987 | Haller et al. | 370/3 |
| 4,727,601 | 2/1988 | Konishi | 455/612 |
| 4,833,668 | 5/1989 | Rowley et al. | 370/1 |
| 4,834,481 | 5/1989 | Lawson et al. | 350/96.15 |
| 4,841,519 | 6/1989 | Nishio | 370/3 |
| 4,871,225 | 10/1989 | Schembri | 350/96.16 |

FOREIGN PATENT DOCUMENTS 58-117738 7/1983 Japan ...................... 370/3

Primary Examiner—Brian Healy
Attorney, Agent, or Firm—McCubbrey, Bartels, Meyer & Ward

[57] ABSTRACT

A method and apparatus are disclosed for providing a fiber optic distribution network between a central office and a group of users generally in a localized area. The apparatus utilizes a continuous optical fiber primary loop in communication with the central office and passing in the vicinity of each user. Each user is connected to an optical fiber in the primary loop in a manner which provides protection against breaks in the primary loop. Embodiments of the apparatus in which a plurality of users are connected to a single optical are also disclosed.

14 Claims, 5 Drawing Sheets

FIBER OPTIC DISTRIBUTION SYSTEM AND METHOD OF USING SAME

The present invention relates to fiber optic communication networks for use in telephone systems, and more particularly to a distribution system which provides superior redundant communication facilities.

This application is a Continuation-In-Part of U.S. Pat. Application Ser. No. 034,087 filed April 2, 1987, now U.S. Pat. No. 4,871,225, by John Schembri and entitled "FIBER OPTIC DISTRIBUTION NETWORK".

Improvements in fiber optic cables have made such cables an attractive alternative to metallic conductors for providing telephone and other communication services that function through a telephone central office or the like. The individual fibers have enormously greater bandwidths than metallic conductors, and hence are capable of providing communication services which were not previously possible.

In a typical fiber optic based telephone system, cables comprising bundled optical fibers are laid from a telephone central office along routes that pass in the vicinity of potential subscribers. When a new user subscribes to the telephone service, a pair of fibers in one of the cables is cut in the vicinity of the new subscriber. The portions of the fibers between the subscriber and the central office are used to provide a bi-directional communication path between the subscriber and the central office. Typically, one fiber is used to send information in a digital format from the central office to the subscriber's premises, and the other is used to send digital information from the subscriber's premises to the central office.

The portions of the fibers between the subscriber and the end of the cable that is not connected to the telephone central office are wasted. The amount of wasted optical fiber can be a significant fraction of the total cable. Consider a cable starting at the central office which is to service the geographic area from the central office to some distant point. Further assume that potential users are uniformly distributed along the route of the cable in question. In this case, approximately one half of the total fiber length will be wasted when all of the users are connected.

As the amount of information carried on an individual communication link increases, the need for security against loss of the communication link also increases. For example, fiber optics make it possible to provide high speed data communications services within the telephone system for use in computer networks. However, if the fiber cable connecting an important computer in the data processing system to the other computers therein is cut, the entire data processing network may be rendered useless. The economic consequences of such a loss can be severe. Hence, communication systems which provide redundant communication which protects against such losses are highly advantageous.

One prior art method for providing redundant communication utilizes two sets of fibers in the cable between the user and the central office. In this scheme, two fibers are used to provide communication from the central office to the subscriber, and two fibers are used to provide communication from the subscriber to the central office. This type of system provides security against loss of communication on an individual fiber; however, it does not provide protection against loss of the entire cable. Such cable losses can occur during construction work when excavation equipment inadvertently breaks a cable.

The cost of providing four individual fibers for each user also detracts from such schemes. The fiber optic cables represent a significant portion of the cost of a communication system based on fiber optics. Hence, it would be advantageous to provide a distribution network that allowed more than one subscriber to be connected to each optical fiber. However, as the number of users serviced by any given fiber increases, the need for security against cable breaks also increases.

Broadly, it is an object of the present invention to provide an improved fiber optic communication system.

It is a further object of the present invention to provide a fiber optic communication system which makes more efficient use of the fibers in the fiber optic cables.

It is yet another object of the present invention to provide a fiber optic communication system which provides protection against a cable interruption. for receiving light signals of a second predetermined wavelength from the central office on the first optical fiber segment. The patch box also includes a second light transmitter for transmitting light signals of a third predetermined wavelength to the central office on the second optical fiber segment and a second light detector for receiving light signals of a fourth predetermined wavelength from the central office on the second optical fiber segment.

DETAILED DESCRIPTION OF THE INVENTION

It is still another object of the present invention to provide a fiber optic communication system which allows multiple subscribers to be connected to a single optical fiber while providing protection against a cable interruption.

These and other objects of the present invention will become apparent from the following detailed description of the present invention and the accompanying drawings.

SUMMARY OF THE INVENTION

The present invention comprises a fiber optic distribution system for providing communication access between a central office and a plurality of users generally in a localized area. The fiber optic distribution system includes an optical fiber primary loop having one or more optical fibers. The primary loop leaves the central office, passes in the vicinity of each user of said plurality of users, and returns to the central office. The distribution system also includes a patch box arranged in the primary loop for coupling a selected user with the central office through the primary loop. The patch box includes means for interrupting an optical fiber in the primary loop to create first and second optical fiber segments. Each of the optical fiber segments provides a bi-directional communication path between the user and the central office. The patch box includes a first light transmitter which transmits light signals of a first predetermined wavelength to the central office on the first optical fiber segment and a first light detector.

Figure 1:
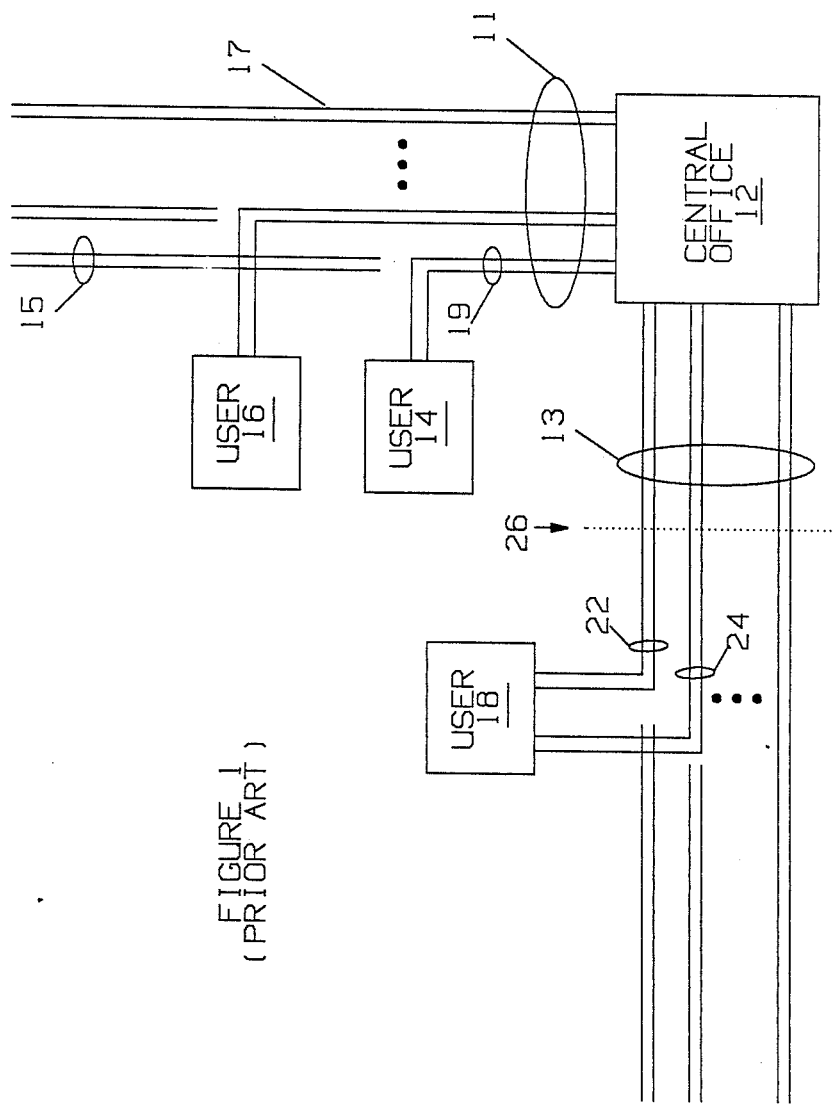
FIG. 1 illustrates a typical prior art fiber optic communication system for providing telephone and related services between a central office and a number of system users.

FIG. 1 illustrates a typical prior art fiber optic communication system for providing telephone and related services between a central office 12 and a number of system users of which users 14, 16, and 18 are typical. Users 14 and 16 are connected to central office 12 by fibers in a fiber optic cable 11. User 18 is connected to central office 12 by fibers in a second fiber optic cable 13. Each fiber optic cable comprises a plurality of optical fibers of which fiber 17 is typical. The fiber optic cables are initially laid from central office 12 along routes which pass in the vicinity of potential users. When a new user subscribes to the telephone service, a pair of fibers in the cable passing near the user in question are cut. The new user is then connected to the portions of these fibers which run between the central office and the user in question. For example, user 14 is connected to the central office by fiber segments 19. The remaining portions of the fibers in question are wasted. The wasted fiber segments corresponding to fiber segments 19 are shown at 15 in FIG. 1.

At each user, the fiber which provides communications from the central office to the user terminates in a light detector which converts the light signals on the fiber to electrical signals. The fiber which is used to send signals from the user to the central office is connected to a light source which is typically a laser or a light emitting diode. Similarly the receiving and transmitting ends of the fibers at the central office terminate with a light detector and a laser, respectively.

Telephone service may be lost if either one of the fibers is broken. As was pointed out above, such breaks often occur during construction work. In addition, service may be lost if either of the light detectors or the lasers become non-functional.

For those users requiring added security against service interruptions arising from fiber failures, additional fibers are assigned. For example, user 18 is connected to two sets of fibers 22 and 24. Such redundant service protects user 18 against a failure in one of the fibers. Such failures arise when the fiber splices making the connections between the cut ends of the fibers in cable 13 and the user 18 are disturbed. In addition, this type of redundant connection protects the user from interruptions resulting from laser or light detector failures.

Unfortunately, this type of redundant service does not protect user 18 against a break in the entire cable. If cable 13 were cut at location 26, both sets of fibers connecting user 18 with central office 12 would be lost. As noted above, such cuts often occur when construction equipment is used to excavate areas in the vicinity of the fiber optic cables.

Figure 2:
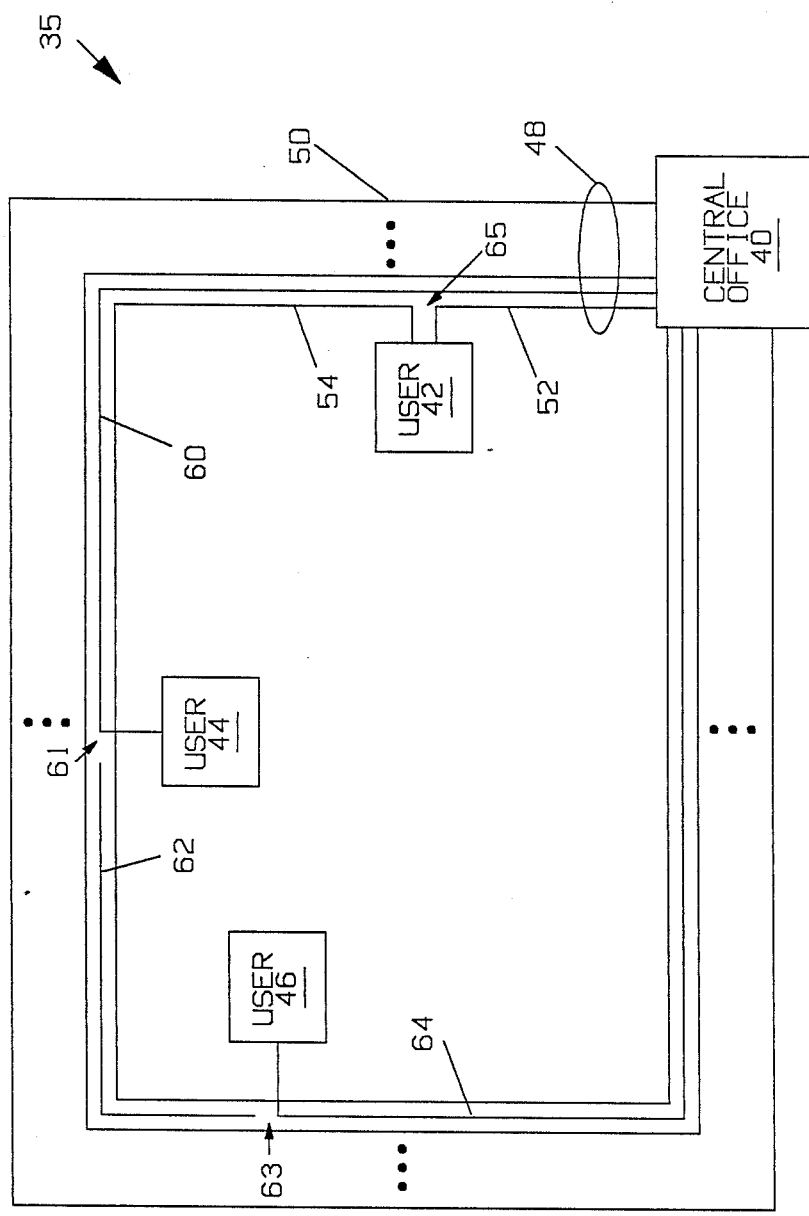
FIG. 2 illustrates a fiber optic distribution system according to present invention.

The present invention provides protection against service interruptions caused by such cable cuts and reduces the amount of optical fiber wasted when new subscribers are connected to the telephone system. A fiber optic distribution system according to the present invention is illustrated in FIG. 2 at 35. Fiber optic system 35 connects a number of telecommunication users to a central office 40. Typical users are shown at 42, 44, and 46. The users are connected to central office 40 by means of a fiber optic cable 48 which comprises a plurality of optical fibers of which fiber 50 is typical.

Cable 48 is laid in a loop configuration. That is, it leaves central office 40, passes in the vicinity of potential subscribers, and then returns to central office 40. The route taken by cable 48 is preferably chosen to insure that different portions of cable 48 are geographically separated from one another. This geographic separation insures that the probability of inadvertently cutting cable 48 in more than one place in a single event is minimized.

Cable 48 serves two types of telephone users, those requiring redundant service for security against optical fiber failures and those requiring only normal telephone service. User 42 shown in FIG. 2 is provided with redundant service, while users 44 and 46 ar provided with only normal service.

In the preferred embodiment of the present invention, a user receiving normal service is connected to central office 40 by a single fiber. The fiber is used to provide a bi-directional communication path with the central office by utilizing wavelength multiplexing. That is, data is sent from the user to the central office using one color of light and data is sent from the central office to the user using a different color of light. The user is connected by interrupting one of the fibers in cable 48.

This interruption creates two fiber segments, one connecting the user to the central office by a first geographic route and one connecting the user to the central office by a second geographic route. When only normal service is desired, one of these two segments is selected for connecting the user to the central office. The remaining segment is then available for use in connecting a second user to the central office by the other geographic route.

For example, user 44 is connected to central office 40 by making a cut 61 in a fiber to form segment 60 connecting user 44 to the central office. The remaining portion of the fiber in question is available for connecting another user to the central office. This portion is used to connect user 46 to the central office. To connect user 46 to the central office, a second cut 63 is introduced in the fiber in the vicinity of user 46. This cut creates fiber segments 62 and 64. Segment 64 connects user 46 to central office 40. Segment 62 is wasted.

The amount of wasted fiber can be minimized by careful selection of the pairs of users connected by any given fibers. It will be apparent to those skilled in the art that the waste is minimized by choosing users who are geographically close to one another.

In the present invention, if a user requires redundant service, e.g., user 42, then the user is connected to central office 40 by two different geographic paths. When user 42 is connected to the distribution system, a fiber which has not been interrupted is chosen. A break 65 is introduced in the fiber in the vicinity of the user, creating two segments 52 and 54. User 42 is connected to each segment using the same type of wavelength multiplexing system described above for non-redundant service users. Segment 52 provides a bi-directional communication path to central office 40 by a first geographic route, and segment 54 provides a bi-directional communication path to central office 40 by a second geographic route.

Figure 3:
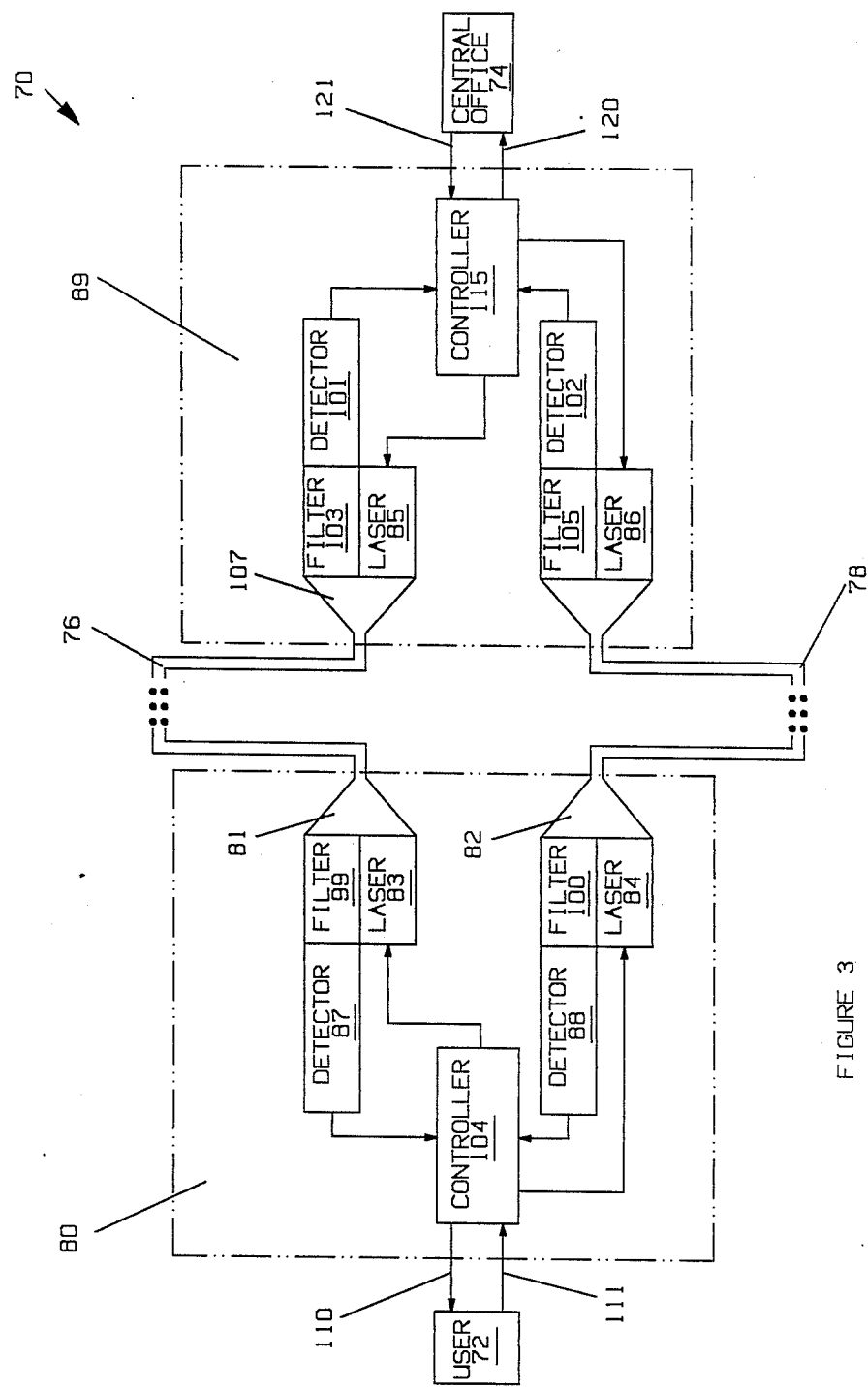
FIG. 3 illustrates the preferred manner in which a redundant service user is connected to two fiber optic segments in a fiber optic distribution system according to the present invention.

The preferred manner in which a redundant service user is connected to the two fiber optic segments is illustrated in FIG. 3 at 70. FIG. 3 shows a single user 72 connected to a central office 74 by two fiber optic segments 76 and 78 created by cutting a single fiber loop in the vicinity of user 72.

User 72 is connected to segments 76 and 78 by a patch box 80. Patch box 80 includes two fiber adapters 81 and 82. Each fiber adapter provides a means for interfacing light signals to and from the fiber connected thereto. Fiber adapter 81 interfaces signals to and from segment 76, and fiber adapter 82 interfaces signals to and from segment 78.

Each of the segments 76 and 78 provides an independent bi-directional communication path between user 72 and central office 74. Signals from user 72 to central office 74 are sent on segments 76 and 78 using lasers 83 and 84, respectively. Each laser transmits signals using a first predetermined wavelength. These signals are detected in central office 74 by detectors 101 and 102 in patch box 89 located in central office 74. The filters 103 and 105 are used to remove light of other wavelengths from the light exiting each segment. For example, filter 103 guarantees that light from laser 85 which is reflected back toward detector 101 by the inner surface of adapter 107 is not detected by detector 101. In this way, it is assured that detector 101 only detects light transmitted by laser 83 in patch box 80.

Similarly, signals from central office 74 to user 72 are sent by lasers 85 and 86 in central office 74 and received by detectors 87 and 88 in patch box 80. These signals are sent at a second predetermined wavelength which is different from said first predetermined wavelength. Filters 99 and 100 are used to remove all light which does not have a wavelength equal to said second predetermined wavelength.

The outputs of detectors 87 and 88 are inputted to a controller 104 which selects one of the outputs for transmission to user 72 on line 110. At any given time, controller 104 selects one of the two segments 76 and 78 for use in transmitting signals to and from central office 74. If controller 104 detects an interruption in service on the segment in question or an unacceptable bit error rate, controller 104 switches to the other segment.

Similarly, controller 104 receives signals on line 111 from user 72 for transmission to central office 74. Controller 104 outputs these signals to both of lasers 83 and 84. As noted above, these signals are received by detectors 101 and 102 which output detected signals to controller 115 in patch box 89 central office 74. Controller 115 operates in a manner analogous to controller 104 in patch box 80. Controller 115 selects the signal from the currently used segment for transmission to central office 74 on line 120. Similarly, central office 74 transmits signals to controller 115 on line 121 for transmission to user 72. Controller 115 couples these signals to lasers 85 and 86. In the preferred embodiment of the present invention, the currently active segment selected by controller 115 does not depend on the active segment chosen by controller 104.

Figure 4:
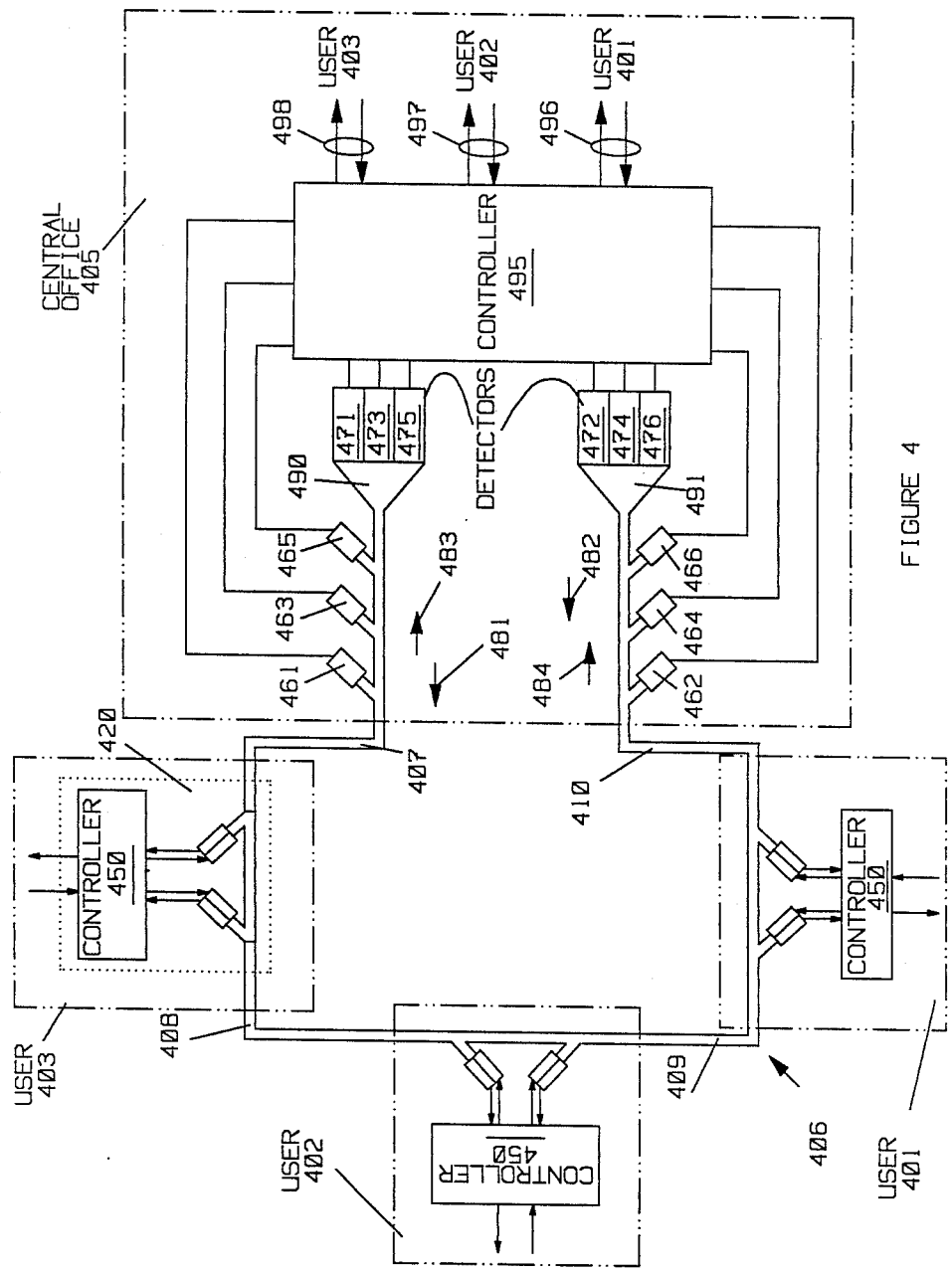
FIG. 4 illustrates a second embodiment of a fiber optic distribution system according to the present invention which provides for more than one user on each fiber of the primary fiber optic cable.
Figure 5:
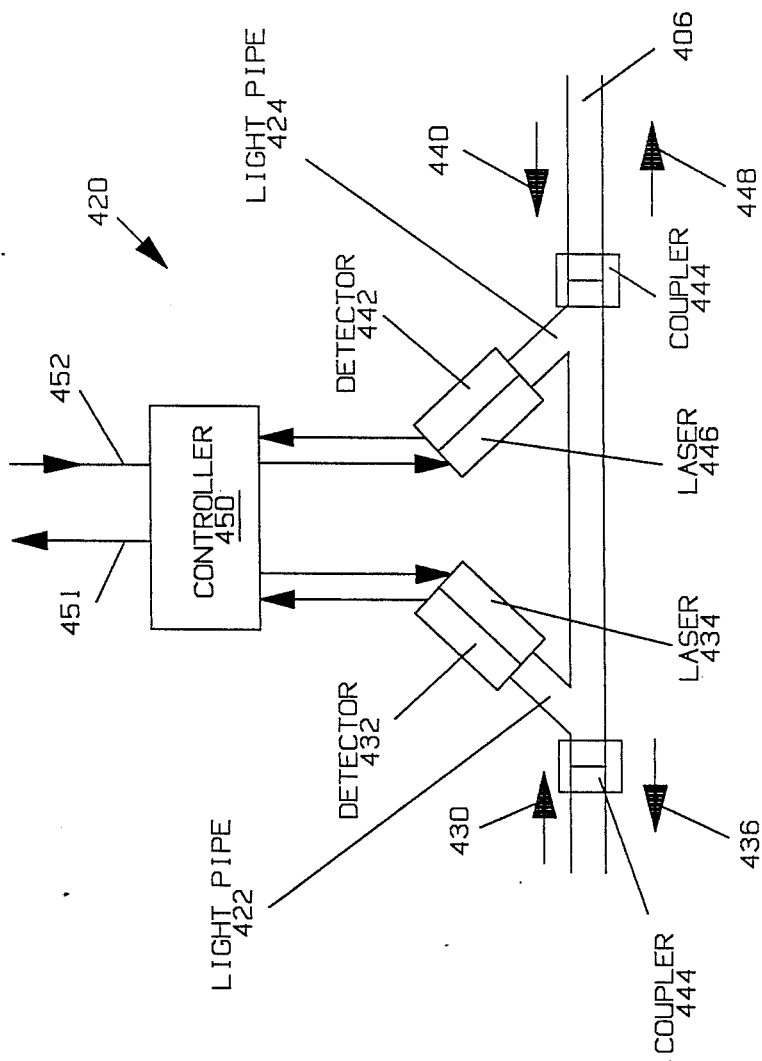
FIG. 5 is a more detailed illustration of the interface unit 420 shown in FIG. 4.

The embodiment of the present invention illustrated in FIG. 2 utilizes one fiber loop of cable 48 for connecting each user to central office 40. A second embodiment of the present invention which provides for more than one user on each fiber of the cable is illustrated in FIGS. 4 and 5. FIG. 4 illustrates the manner in which each of three users 401, 402, and 403 is connected to a central office 405 by a single optical fiber 406 which comprises segments 407–410. Each user is connected to fiber 406 by cutting fiber 406 and inserting an interface unit of which interface unit 420 is typical.

Each user communicates with central office 405 using a unique pair of wavelengths in a manner analogous to that described above with reference to FIGS. 2 and 3. That is, signals are sent to the central office via two geographic routes using light of a first predetermined wavelength and signals are received from the central office via two different geographic routes by using light of a second wavelength. The values of said first and second predetermined wavelengths are different for each user; hence, the privacy of the communication between central office 405 and each user is assured. In addition, the use of different wavelengths provides each user with the maximum bandwidth of the optical fiber at any given wavelength.

A more detailed diagrammatic view of interface unit 420 is shown in FIG. 5. Interface unit 420 is inserted into fiber 406 with the aid of coupling units 444. Such optical couplers are conventional in the fiber optic arts. Interface unit 420 maintains the continuity of fiber 406. That is, light signals generated by other users or the central office are not blocked by interface unit 420. Interface unit 420 includes two "Y" shaped light pipes 422 and 424. Light pipe 422 splits the light traveling in fiber 406 in the direction of arrow 40 such that a portion of said light is incident on a detector 432. The remaining light continues down fiber 406. In addition, light pipe 422 directs light generated by a laser 434 into fiber 406 such that said light traverses fiber 406 in the direction of arrow 436.

Similarly, light pipe 424 splits the light traversing fiber 406 in the direction of arrow 440 such that a portion of said light is incident on a detector 442. In addition, light pipe 424 directs light generated by a laser 446 down fiber 406 in the direction indicated by arrow 448.

Detectors 432 and 442 detect light of a first predetermined wavelength and lasers 434 and 446 generate light of a second predetermined wavelength. The values of said first and second wavelengths are different for each user. Hence, any given user can only receive communications directed to that user.

Interface unit 420 also includes a controller 450 which receives the outputs of detectors 432 and 442. Controller 450 selects one of these outputs for transmission to the user on line 451. Controller 450 also receives signals from the user on line 452 and couples those signals to lasers 434 and 446.

Controller 450 includes circuitry for detecting errors in the data received by detectors 432 and 442. This error detection circuitry preferably recognizes bit transmission errors as well complete loss of signal. Such error detection circuitry is conventional in the electronic arts. At any given time, controller 450 defines one of detectors 432 and 442 as the active detector. Since each laser and detector pair communicate with the central office utilizing a different portion of fiber 406, the choice of active detector defines which portion of fiber 406 is currently utilized for communication with central office 405.

When the bit error rates exceed a predetermined threshold, or when reception is lost by the currently active detector, controller 450 automatically switches to the other detector. Hence, if a break occurs in fiber 406 which interrupts transmission on the currently active communication path, communication is automatically switched to the other communication path to central office 405 which is routed via a different portion of fiber 406. Since the different portions of fiber 406 preferably run along different geographic routes, a single break in fiber 406 will, at most, interrupt communication on one of detectors 432 and 442.

Central office 405 includes two detectors and two lasers for each of the users 401-403. The lasers corresponding to user 401 are shown at 461 and 462, respectively. The lasers corresponding to user 402 are shown at 463 and 464, respectively. And, the lasers corresponding to user 403 are shown at 465 and 466, respectively. Similarly, the detectors corresponding to user 401 are shown at 471 and 472, respectively. The detectors corresponding to user 402 are shown at 473 and 474, respectively. And, the detectors corresponding to user 403 are shown at 475 and 476, respectively.

Lasers 461, 463, and 465 transmit light down segment 407 of optical fiber 406 in the direction indicated by arrow 481. The wavelengths at which these lasers transmit will be denoted by $L_1$, $L_2$, and $L_3$, respectively. Similarly, lasers 462, 464, and 466 transmit light down segment 410 of optical fiber 406 in the direction indicated by arrow 482. The wavelengths at which these lasers transmit are also $L_1$, $L_2$, and $L_3$, respectively.

The detectors in each of the interface units 420 at the user's premises are tuned to the corresponding laser wavelength. That is, the detectors in the interface unit at user 401 detect only light of wavelength $L_1$. The detectors in the interface unit at user 402 detect only light of wavelength $L_2$, and so on. The wavelengths detected are preferably determined by optical filters incorporated in each detector.

Detectors 471, 473, and 475 are coupled to segment 407 of fiber 406 by a light pipe 490 which illuminates each detector. These detectors receive light traveling in the direction shown by arrow 483. Each detector is equipped with a filter which assures that the detector in question only detects light of a specified wavelength. The wavelengths of the light detected by detectors 471, 473, and 475 will be denoted as $D_1$, $D_2$, and $D_3$, respectively. Similarly, detectors 472, 474, and 476 are coupled to segment 410 of fiber 406 by a light pipe 491 which illuminates each detector. These detectors receive light traveling in the direction shown by arrow 484. Each detector is equipped with a filter which assures that the detector in question only detects light of a specified wavelength. The wavelengths of the light detected by detectors 472, 474, and 476 are $D_1$, $D_2$, and $D_3$, respectively.

The lasers in each of the interface units 420 are tuned to transmit the corresponding wavelength. That is, the lasers in the interface unit 420 at user 401 transmits light of wavelength $D_1$. The lasers in the interface unit 420 at user 402 transmit light of wavelength $D_2$, and so on.

Detectors 471-476 and lasers 461-466 are coupled to a controller 495 in central office 405. Controller 495 includes one output line and one input line for each user. The pair of lines for user 401 are shown at 496, the pair of lines for user 402 are shown at 497, and the pair of lines for user 403 are shown at 498.

Data input to controller 495 for a particular user is coupled to the lasers which transmit on the wavelength assigned to that user. For example, data which is to be transmitted to user 401 is input to controller 495 on the input line of lines 496. This data is coupled to lasers 461 and 462 which transmit the data on wavelength $L_1$. The data transmitted by laser 462 arrives at user 401 on segment 410 of fiber 406. The data transmitted by laser 461 arrives at user 401 on segment 409 after having traversed segments 407 and 408.

Since each user is connected to central office 405 by two different bi-directional communication paths, each user is protected against any single break in fiber 406. Consider the case in which a break occurs which prevents light from being transmitted on segment 408. In particular, consider user 401. If the currently active detector in the interface unit 420 at user 401 is the detector that receives signals from laser 462 via segment 410, user 401 will not be affected by the break. If, on the other hand, the detector in question were the detector that received light from laser 461 via segment 409, the controller 450 in the interface unit would detect a loss of reception on segment 409. The controller 450 would then make the other detector, i.e., the detector which receives light from laser 462 via segment 410, the active detector.

It will be apparent to those skilled in the art that the controller associated with each user will similarly switch detectors if necessary to restore communication with central office 405. Hence, this embodiment of the present invention provides communication between several users and the central office on a single optical fiber while preserving the "self-healing" aspects of the embodiment shown in FIGS. 3 and 4. That is, the system automatically reconfigures itself to compensate for a single break in the fiber.

The number of users that can be accommodated on a single fiber is determined by the sensitivity of the various detectors and the amount of light generated by the various lasers. The light pipes in each of the interface units 420 divert a portion of the available light out of the fiber. If too many users are connected to a given fiber, there will be too little light for the detectors in the interface units 420 to operate. The number of users can increased by increasing the amount of light generated by lasers 461-466.

Similarly, if beam splitters such as light pipes 490-491 are used to illuminate detectors 471-476, the amount of light detected by any given detector will be inversely related to the number of users. It will be apparent to those skilled in the art that this limitation may be removed by utilizing a device which spatially separates different wavelengths to illuminate detectors 471-476. For example, a prism or diffraction grating may be utilized. In this case, all of the light at a given wavelength will be directed to a single detector. Such an arrangement also eliminates the need for wavelength filters in front of each of the detectors. Alternatively, more powerful lasers could be included in each of the interface units 420.

In the above described embodiments of the present invention, a controller such as controller 450 selects one of the two bi-directional communication paths to be the active bi-directional communication path at any given time. It will be apparent to those skilled in the art that the self-healing feature of the present invention does not require that one communication path be so defined provided a delay is introduced into the signals in one of the detectors to compensate for different optical path lengths. In this case, the controllers can be replaced by a simple OR circuit which combines the outputs of the detectors.

Referring to FIG. 3, assume that fiber optic segment 76 is longer than fiber optic segment 78. If a delay circuit is included in detectors 88 and 102 which provides a delay equal to the difference in signal transit time between segments 76 and 78, then controllers 104 and 115 may be replaced by OR circuits In this case, when both segments are functional, identical signals will be ORed to produce the output signal. If one segment is cut, the signal from the other segment will determine the output of the OR circuit.

Unfortunately, this simplification requires the inclusion of a time delay circuit in each detector. Further, the time delay in question must be separately set for each user. Finally, if one of the bidirectional communication paths fails because of a malfunction in a detector, the output of the OR circuit may not represent the signal on the correctly functioning communication path. For example, suppose detector 87 fails such that it puts out a continuous string of ones. Then the OR circuit will likewise produce a continuous string of ones. Hence, active switching between the two bi-directional communication paths is preferred.

The above described embodiments of the present invention utilize the same pair of wavelengths to communicate along each of the optical fiber segments. That is, any given user uses one wavelength to communicate with the central office and one wavelength to receive signals from the central office. Referring to FIG. 3, the wavelengths of lasers 83 and 84 are the same, and filters 99 and 100 are likewise the same. This arrangement is preferred because it minimizes the number of different wavelengths at which light is received and transmitted. However, it will be apparent to those skilled in the art that systems in which four different wavelengths are utilized to communicate information between each user and the central office are also possible. For example, referring to FIG. 3, user 72 could send information to the central office on segment 76 using a different wavelength from that used to send the same information on segment 78. Similarly, central office 74 could use different wavelengths to send information on segments 76 and 78 to user 72. This embodiment of the present invention will be referred to as the four wavelength embodiment below.

The descriptions of the embodiments of the present invention shown in FIGS. 2-5 have assumed that all users are receiving redundant service. If a given user does not require redundant service, that user's interface to the optical fiber need include only one transmitter and one receiver for transmitting and receiving light on one of the two segments of the optical fiber which were created by inserting the interface. If the optical distribution system utilizes one fiber segment for each non-redundant service user, then a second non-redundant service user can be connected to the other optical fiber segment.

If the embodiment of the present invention utilizes one fiber for servicing a plurality of users in the redundant service mode, i.e., the embodiment shown in FIGS. 4 and 5, a non-redundant service user can be connected by utilizing an interface unit which includes only one laser, one detector, and one "Y" shaped light pipe. For example, such an interface unit would resemble interface unit 420 shown in FIG. 5 with light pipe 424, detector 442, and laser 446 removed. A second non-redundant user could be connected to the same fiber by using an interface unit which resembles interface unit 420 shown in FIG. 5 with light pipe 422, detector 432, and laser 434 removed. By using pairs of "complementary" interfaces, the number of non-redundant users that can be connected to a single fiber is increased, since a pair of complementary interfaces removes the same amount of light from the fiber as one interface 420 used for providing redundant service. The four wavelength embodiment of the present invention described above may be utilized when both redundant and non-redundant service is provided on the same fiber.

Although the above described embodiments of the present invention have been described with reference to a telephone central office, it will be apparent to those skilled in the art that the present invention will also function in any system in which a plurality of users must be connected to a "master" user in a manner which is immune to cable breaks. Accordingly, there has been described herein a fiber optic distribution system for use in telephone systems and the like. Various modifications to the present invention will become apparent to those skilled in the art from the foregoing description and accompanying drawings. Accordingly, the present invention is to be limited solely by the scope of the following claims.

What is claimed is:

1. A fiber optic distribution system for providing communication access between a central office and a plurality of users generally in a localized area, said fiber optic distribution system comprising:

an optical fiber primary loop including one or more optical fibers, said primary loop leaving said central office, passing in the vicinity of each user of said plurality of users, and returning to said central office, and at least one or more patch means arranged in said primary loop for coupling a selected user with the central office through said primary loop, each said patch means including means for interrupting an optical fiber in said primary loop to create first and second optical fiber segments, each said optical fiber segment providing a bi-directional communication path between said user and said central office, each said patch means including first light transmitting means for transmitting light signals of a first predetermined wavelength to said central office on said first optical fiber segment and first light detecting means for receiving light signals of a second predetermined wavelength from said central office on said first optical fiber segment, said first and second wavelengths being chosen such that no two said patch means coupled to the same optical fiber utilize the same first and second wavelength.

2. The fiber optic distribution system of claim 1 wherein each said patch means further comprises second light transmitting means for transmitting light signals of a third predetermined wavelength to said central office on said second optical fiber segment and second light detecting means for receiving light signals of a fourth predetermined wavelength from said central office on said second optical fiber segment, said third and fourth wavelengths being chosen such that no two said patch means coupled to the same optical fiber utilize the same third and fourth wavelength.

3. The fiber optic distribution system of claim 2 wherein said first wavelength is the same as said third wavelength.

4. The fiber optic distribution system of claim 3 wherein said second wavelength is the same as said fourth wavelength.

5. The fiber optic distribution system of claim 2 wherein said patch means further comprises control mean, said control means comprising:

means for receiving electrical signals from a said user and for coupling said received signals to said first and second light transmitting means;

means for transmitting electrical signals received on a selected one of said first or second light detecting means to said user;

error detecting means for detecting transmission errors on the said optical fiber segment on which said selected detector detects light signals, said error detecting means including means for causing said selected one of said first and second light detecting means to be changed to the other of said first and second light detecting means when a said transmission error is detected.

6. The fiber optic distribution system of claim 5 wherein said patch means further comprises means for maintaining continuity between said first and second optical fiber segments.

7. The fiber optic distribution system of claim 1 wherein different portions of said optical fiber primary loop are substantially spaced apart to reduce the probability that an event leading to an interruption in said optical fiber primary loop will result in said optical fiber primary loop being interrupted in more than one place.

8. A method for providing communication access between a central office and a plurality of users generally in a localized area, said method comprising the steps of:

providing an optical fiber primary loop including one or more optical fibers, said primary loop leaving said central office, passing in the vicinity of each user of said plurality of users, and returning to said central office, and interrupting an optical fiber in said primary loop by the insertion of at least one or more patch means therein to create first and second optical fiber segments, each said optical fiber segment providing a bi-directional communication path between said user and said central office, said patch means including first light transmitting means for transmitting light signals of a first predetermined wavelength to said central office on said first optical fiber segment and first light detecting means for receiving light signals of a second predetermined wavelength from said central office on said first optical fiber segment, said first and second wavelengths being chosen such that no two said patch means coupled to the same optical fiber utilize the same first and second wavelength.

9. The method of claim 8 wherein said patch means further comprises second light transmitting means for transmitting light signals of a third predetermined wavelength to said central office on said second optical fiber segment and second light detecting means for receiving light signals of a fourth predetermined wavelength from said central office on said second optical fiber segment, said third and fourth wavelengths being chosen such that no two said patch means coupled to the same optical fiber utilize the same third and fourth wavelength.

10. The method of claim 9 wherein said first wavelength is the same as said third wavelength.

11. The method of claim 10 wherein said second wavelength is the same as said fourth wavelength.

12. The method of claim 9 wherein said patch means further comprises control means, said control means comprising:

means for receiving electrical signals from a said user and for coupling said received signals to said first and second light transmitting means;

means for transmitting electrical signals received on a selected one of said first or second light detecting means to said user;

error detecting means for detecting transmission errors on the said optical fiber segment on which said selected detector detects light signals, said error detecting means including means for causing said selected one of said first and second light detecting means to be changed to the other of said first and second light detecting means when a said transmission error is detected.

13. The method of claim 12 wherein said patch means further comprises means for maintaining continuity between said first and second optical fiber segments.

14. The method of claim 8 wherein different portions of said optical fiber primary loop are substantially spaced apart to reduce the probability that an event leading to an interruption in said optical fiber primary loop will result in said optical fiber primary loop being interrupted in more than one place.

* * * * *

UNITED STATES PATENT AND TRADEMARK OFFICE
CERTIFICATE OF CORRECTION

PATENT NO. : 4,946,244
DATED : August 7, 1990
INVENTOR(S) : John J. Schembri

It is certified that error appears in the above-identified patent and that said Letters Patent is hereby corrected as shown below:

Columns 1-12 should be deleted to be replaced with Columns 1-12 as shown on the attached sheets.

Signed and Sealed this

Thirteenth Day of October, 1992

*Attest:*

DOUGLAS B. COMER

*Attesting Officer*     *Acting Commissioner of Patents and Trademarks*

FIBER OPTIC DISTRIBUTION SYSTEM AND METHOD OF USING SAME

The present invention relates to fiber optic communication networks for use in telephone systems, and more particularly to a distribution system which provides superior redundant communication facilities.

This application is a continuation-in-part of U.S. patent application Ser. No. 034,087 filed Apr. 2, 1987, now U.S. Pat. No. 4,871,225, by John Schembri and entitled "FIBER OPTIC DISTRIBUTION NETWORK".

Improvements in fiber optic cables have made such cables an attractive alternative to metallic conductors for providing telephone and other communication services that function through a telephone central office or the like. The individual fibers have enormously greater bandwidths than metallic conductors, and hence are capable of providing communication services which were not previously possible.

In a typical fiber optic based telephone system, cables comprising bundled optical fibers are laid from a telephone central office along routes that pass in the vicinity of potential subscribers. When a new user subscribes to the telephone service, a pair of fibers in one of the cables is cut in the vicinity of the new subscriber. The portions of the fibers between the subscriber and the central office are used to provide a bi-directional communication path between the subscriber and the central office. Typically, one fiber is used to send information in a digital format from the central office to the subscriber's premises, and the other is used to send digital information from the subscriber's premises to the central office.

The portions of the fibers between the subscriber and the end of the cable that is not connected to the telephone central office are wasted. The amount of wasted optical fiber can be a significant fraction of the total cable. Consider a cable starting at the central office which is to service the geographic area from the central office to some distant point. Further assume that potential users are uniformly distributed along the route of the cable in question. In this case, approximately one half of the total fiber length will be wasted when all of the users are connected.

As the amount of information carried on an individual communication link increases, the need for security against loss of the communication link also increases. For example, fiber optics make it possible to provide high speed data communications services within the telephone system for use in computer networks. However, if the fiber cable connecting an important computer in the data processing system to the other computers therein is cut, the entire data processing network may be rendered useless. The economic consequences of such a loss can be severe. Hence, communication systems which provide redundant communication which protects against such losses are highly advantageous.

One prior art method for providing redundant communication utilizes two sets of fibers in the cable between the user and the central office. In this scheme, two fibers are used to provide communication from the central office to the subscriber, and two fibers are used to provide communication from the subscriber to the central office. This type of system provides security against loss of communication on an individual fiber; however, it does not provide protection against loss of the entire cable. Such cable losses can occur during construction work when excavation equipment inadvertently breaks a cable.

The cost of providing four individual fibers for each user also detracts from such schemes. The fiber optic cables represent a significant portion of the cost of a communication system based on fiber optics. Hence, it would be advantageous to provide a distribution network that allowed more than one subscriber to be connected to each optical fiber. However, as the number of users serviced by any given fiber increases, the need for security against cable breaks also increases.

Broadly, it is an object of the present invention to provide an improved fiber optic communication system.

It is a further object of the present invention to provide a fiber optic communication system which makes more efficient use of the fibers in the fiber optic cables.

It is yet another object of the present invention to provide a fiber optic communication system which provides protection against a cable interruption.

It is still another object of the present invention to provide a fiber optic communication system which allows multiple subscribers to be connected to a single optical fiber while providing protection against a cable interruption.

These and other objects of the present invention will become apparent from the following detailed description of the present invention and the accompanying drawings.

SUMMARY OF THE INVENTION

The present invention comprises a fiber optic distribution system for providing communication access between a central office and a plurality of users generally in a localized area. The fiber optic distribution system includes an optical fiber primary loop having one or more optical fibers. The primary loop leaves the central office, passes in the vicinity of each user of said plurality of users, and returns to the central office. The distribution system also includes a patch box arranged in the primary loop for coupling a selected user with the central office through the primary loop. The patch box includes means for interrupting an optical fiber in the primary loop to create first and second optical fiber segments. Each of the optical fiber segments provides a bi-directional communication path between the user and the central office. The patch box includes a first light transmitter which transmits light signals of a first predetermined wavelength to the central office on the first optical fiber segment and a first light detector for receiving light signals of a second predetermined wavelength from the central office on the first optical fiber segment. The patch box also includes a second light transmitter for transmitting light signals of a third predetermined wavelength to the central office on the second optical fiber segment and a second light detector for receiving light signals of a fourth predetermined wavelength from the central office on the second optical fiber segment.

BRIEF DESCRIPTION OF THE DRAWINGS

FIG. 1 illustrates a typical prior art fiber optic communication system for providing telephone and related services between a central office and a number of system users.

FIG. 2 illustrates a fiber optic distribution system according to the present invention.

FIG. 3 illustrates the preferred manner in which a redundant service user is connected to two fiber optic segments in a fiber optic distribution system according to the present invention.

FIG. 4 illustrates a second embodiment of a fiber optic distribution system according to the present invention which provides for more than one user on each fiber of the primary fiber optic cable.

FIG. 5 is a more detailed illustration of the interface unit 420 shown in FIG. 4.

DETAILED DESCRIPTION OF THE INVENTION

FIG. 1 illustrates a typical prior art fiber optic communication system for providing telephone and related services between a central office 12 and a number of system users of which users 14, 16, and 18 are typical. Users 14 and 16 are connected to central office 12 by fibers in a fiber optic cable 11. User 18 is connected to central office 12 by fibers in a second fiber optic cable 13. Each fiber optic cable comprises a plurality of optical fibers of which fiber 17 is typical. The fiber optic cables are initially laid from central office 12 along routes which pass in the vicinity of potential users. When a new user subscribes to the telephone service, a pair of fibers in the cable passing near the user in question are cut. The new user is then connected to the portions of these fibers which run between the central office and the user in question. For example, user 14 is connected to the central office by fiber segments 19. The remaining portions of the fibers in question are wasted. The wasted fiber segments corresponding to fiber segments 19 are shown at 15 in FIG. 1.

At each user, the fiber which provides communications from the central office to the user terminates in a light detector which converts the light signals on the fiber to electrical signals. The fiber which is used to send signals from the user to the central office is connected to a light source which is typically a laser or a light emitting diode. Similarly the receiving and transmitting ends of the fibers at the central office terminate with a light detector and a laser, respectively.

Telephone service may be lost if either one of the fibers is broken. As was pointed out above, such breaks often occur during construction work. In addition, service may be lost if either of the light detectors or the lasers become non-functional.

For those users requiring added security against service interruptions arising from fiber failures, additional fibers are assigned. For example, user 18 is connected to two sets of fibers 22 and 24. Such redundant service protects user 18 against a failure in one of the fibers. Such failures arise when the fiber splices making the connections between the cut ends of the fibers in cable 13 and the user 18 are disturbed. In addition, this type of redundant connection protects the user from interruptions resulting from laser or light detector failures.

Unfortunately, this type of redundant service does not protect user 18 against a break in the entire cable. If cable 13 were cut at location 26, both sets of fibers connecting user 18 with central office 12 would be lost. As noted above, such cuts often occur when construction equipment is used to excavate areas in the vicinity of the fiber optic cables.

The present invention provides protection against service interruptions caused by such cable cuts and reduces the amount of optical fiber wasted when new subscribers are connected to the telephone system. A fiber optic distribution system according to the present invention is illustrated in FIG. 2 at 35. Fiber optic system 35 connects a number of telecommunication users to a central office 40. Typical users are shown at 42, 44, and 46. The users are connected to central office 40 by means of a fiber optic cable 48 which comprises a plurality of optical fibers of which fiber 50 is typical.

Cable 48 is laid in a loop configuration. That is, it leaves central office 40, passes in the vicinity of potential subscribers, and then returns to central office 40. The route taken by cable 48 is preferably chosen to insure that different portions of cable 48 are geographically separated from one another. This geographic separation insures that the probability of inadvertently cutting cable 48 in more than one place in a single event is minimized.

Cable 48 serves two types of telephone users, those requiring redundant service for security against optical fiber failures and those requiring only normal telephone service. User 42 shown in FIG. 2 is provided with redundant service, while users 44 and 46 are provided with only normal service.

In the preferred embodiment of the present invention, a user receiving normal service is connected to central office 40 by a single fiber. The fiber is used to provide a bi-directional communication path with the central office by utilizing wavelength multiplexing. That is, data is sent from the user to the central office using one color of light and data is sent from the central office to the user using a different color of light. The user is connected by interrupting one of the fibers in cable 48.

This interruption creates two fiber segments, one connecting the user to the central office by a first geographic route and one connecting the user to the central office by a second geographic route. When only normal service is desired, one of these two segments is selected for connecting the user to the central office. The remaining segment is then available for use in connecting a second user to the central office by the other geographic route.

For example, user 44 is connected to central office 40 by making a cut 61 in a fiber to form segment 60 connecting user 44 to the central office. The remaining portion of the fiber in question is available for connecting another user to the central office. This portion is used to connect user 46 to the central office. To connect user 46 to the central office, a second cut 63 is introduced in the fiber in the vicinity of user 46. This cut creates fiber segments 62 and 64. Segment 64 connects user 46 to central office 40. Segment 62 is wasted.

The amount of wasted fiber can be minimized by careful selection of the pairs of users connected by any given fibers. It will be apparent to those skilled in the art that the waste is minimized by choosing users who are geographically close to one another.

In the present invention, if a user requires redundant service, e.g., user 42, then the user is connected to central office 40 by two different geographic paths. When user 42 is connected to the distribution system, a fiber which has not been interrupted is chosen. A break 65 is introduced in the fiber in the vicinity of the user, creating two segments 52 and 54. User 42 is connected to each segment using the same type of wavelength multiplexing system described above for non-redundant service users. Segment 52 provides a bi-directional communication path to central office 40 by a first geographic route, and segment 54 provides a bi-directional communication path to central office 40 by a second geographic route.

The preferred manner in which a redundant service user is connected to the two fiber optic segments is illustrated in FIG. 3 at 70. FIG. 3 shows a single user 72 connected to a central office 74 by two fiber optic segments 76 and 78 created by cutting a single fiber loop in the vicinity of user 72.

User 72 is connected to segments 76 and 78 by a patch box 80. Patch box 80 includes two fiber adapters 81 and 82. Each fiber adapter provides a means for interfacing light signals to and from the fiber connected thereto. Fiber adapter 81 interfaces signals to and from segment 76, and fiber adapter 82 interfaces signals to and from segment 78.

Each of the segments 76 and 78 provides an independent bi-directional communication path between user 72 and central office 74. Signals from user 72 to central office 74 are sent on segments 76 and 78 using lasers 83 and 84, respectively. Each laser transmits signals using a first predetermined wavelength. These signals are detected in central office 74 by detectors 101 and 102 in patch box 89 located in central office 74. The filters 103 and 105 are used to remove light of other wavelengths from the light exiting each segment. For example, filter 103 guarantees that light from laser 85 which is reflected back toward detector 101 by the inner surface of adapter 107 is not detected by detector 101. In this way, it is assured that detector 101 only detects light transmitted by laser 83 in patch box 80.

Similarly, signals from central office 74 to user 72 are sent by lasers 85 and 86 in central office 74 and received by detectors 87 and 88 in patch box 80. These signals are sent at a second predetermined wavelength which is different from said first predetermined wavelength. Filters 99 and 100 are used to remove all light which does not have a wavelength equal to said second predetermined wavelength.

The outputs of detectors 87 and 88 are inputted to a controller 104 which selects one of the outputs for transmission to user 72 on line 110. At any given time, controller 104 selects one of the two segments 76 and 78 for use in transmitting signals to and from central office 74. If controller 104 detects an interruption in service on the segment in question or an unacceptable bit error rate, controller 104 switches to the other segment.

Similarly, controller 104 receives signals on line 111 from user 72 for transmission to central office 74. Controller 104 outputs these signals to both of lasers 83 and 84. As noted above, these signals are received by detectors 101 and 102 which output detected signals to controller 115 in patch box 89 in central office 74. Controller 115 operates in a manner analogous to controller 104 in patch box 80. Controller 115 selects the signal from the currently used segment for transmission to central office 74 on line 120. Similarly, central office 74 transmits signals to controller 115 on line 121 for transmission to user 72. Controller 115 couples these signals to lasers 85 and 86. In the preferred embodiment of the present invention, the currently active segment selected by controller 115 does not depend on the active segment chosen by controller 104.

The embodiment of the present invention illustrated in FIG. 2 utilizes one fiber loop of cable 48 for connecting each user to central office 40. A second embodiment of the present invention which provides for more than one user on each fiber of the cable is illustrated in FIGS. 4 and 5. FIG. 4 illustrates the manner in which each of three users 401, 402, and 403 is connected to a central office 405 by a single optical fiber 406 which comprises segments 407-410. Each user is connected to fiber 406 by cutting fiber 406 and inserting an interface unit of which interface unit 420 is typical.

Each user communicates with central office 405 using a unique pair of wavelengths in a manner analogous to that described above with reference to FIGS. 2 and 3. That is, signals are sent to the central office via two geographic routes using light of a first predetermined wavelength and signals are received from the central office via two different geographic routes by using light of a second wavelength. The values of said first and second predetermined wavelengths are different for each user; hence, the privacy of the communication between central office 405 and each user is assured. In addition, the use of different wavelengths provides each user with the maximum bandwidth of the optical fiber at any given wavelength.

A more detailed diagrammatic view of interface unit 420 is shown in FIG. 5. Interface unit 420 is inserted into fiber 406 with the aid of coupling units 444. Such optical couplers are conventional in the fiber optic arts. Interface unit 420 maintains the continuity of fiber 406. That is, light signals generated by other users or the central office are not blocked by interface unit 420. Interface unit 420 includes two "Y" shaped light pipes 422 and 424. Light pipe 422 splits the light traveling in fiber 406 in the direction of arrow 430 such that a portion of said light is incident on a detector 432. The remaining light continues down fiber 406. In addition, light pipe 422 directs light generated by a laser 434 into fiber 406 such that said light traverses fiber 406 in the direction of arrow 436.

Similarly, light pipe 424 splits the light traversing fiber 406 in the direction of arrow 440 such that a portion of said light is incident on a detector 442. In addition, light pipe 424 directs light generated by a laser 446 down fiber 406 in the direction indicated by arrow 448.

Detectors 432 and 442 detect light of a first predetermined wavelength and lasers 434 and 446 generate light of a second predetermined wavelength. The values of said first and second wavelengths are different for each user. Hence, any given user can only receive communications directed to that user.

Interface unit 420 also includes a controller 450 which receives the outputs of detectors 432 and 442. Controller 450 selects one of these outputs for transmission to the user on line 451. Controller 450 also receives signals from the user on line 452 and couples those signals to lasers 434 and 446.

Controller 450 includes circuitry for detecting errors in the data received by detectors 432 and 442. This error detection circuitry preferably recognizes bit transmission errors as well as complete loss of signal. Such error detection circuitry is conventional in the electronic arts. At any given time, controller 450 defines one of detectors 432 and 442 as the active detector. Since each laser and detector pair communicate with the central office utilizing a different portion of fiber 406, the choice of active detector defines which portion of fiber 406 is currently utilized for communication with central office 405.

When the bit error rates exceed a predetermined threshold, or when reception is lost by the currently active detector, controller 450 automatically switches to the other detector. Hence, if a break occurs in fiber 406 which interrupts transmission on the currently active communication path, communication is automatically switched to the other communication path to central office 405 which is routed via a different portion of fiber 406. Since the different portions of fiber 406 preferably run along different geographic routes, a single break in fiber 406 will, at most, interrupt communication on one of detectors 432 and 442.

Central office 405 includes two detectors and two lasers for each of the users 401–403. The lasers corresponding to user 401 are shown at 461 and 462, respectively. The lasers corresponding to user 402 are shown at 463 and 464, respectively. And, the lasers corresponding to user 403 are shown at 465 and 466, respectively. Similarly, the detectors corresponding to user 401 are shown at 471 and 472, respectively. The detectors corresponding to user 402 are shown at 473 and 474, respectively. And, the detectors corresponding to user 403 are shown at 475 and 476, respectively.

Lasers 461, 463, and 465 transmit light down segment 407 of optical fiber 406 in the direction indicated by arrow 481. The wavelengths at which these lasers transmit will be denoted by $L_1$, $L_2$, and $L_3$, respectively. Similarly, lasers 462, 464, and 466 transmit light down segment 410 of optical fiber 406 in the direction indicated by arrow 482. The wavelengths at which these lasers transmit are also $L_1$, $L_2$, and $L_3$, respectively.

The detectors in each of the interface units 420 at the user's premises are tuned to the corresponding laser wavelength. That is, the detectors in the interface unit at user 401 detect only light of wavelength $L_1$. The detectors in the interface unit at user 402 detect only light of wavelength $L_2$, and so on. The wavelengths detected are preferably determined by optical filters incorporated in each detector.

Detectors 471, 473, and 475 are coupled to segment 407 of fiber 406 by a light pipe 490 which illuminates each detector. These detectors receive light traveling in the direction shown by arrow 483. Each detector is equipped with a filter which assures that the detector in question only detects light of a specified wavelength. The wavelengths of the light detected by detectors 471, 473, and 475 will be denoted as $D_1$, $D_2$, and $D_3$, respectively. Similarly, detectors 472, 474, and 476 are coupled to segment 410 of fiber 406 by a light pipe 491 which illuminates each detector. These detectors receive light traveling in the direction shown by arrow 484. Each detector is equipped with a filter which assures that the detector in question only detects light of a specified wavelength. The wavelengths of the light detected by detectors 472, 474, and 476 are $D_1$, $D_2$, and $D_3$, respectively.

The lasers in each of the interface units 420 are tuned to transmit the corresponding wavelength. That is, the lasers in the interface unit 420 at user 401 transmits light of wavelength $D_1$. The lasers in the interface unit 420 at user 402 transmit light of wavelength $D_2$, and so on.

Detectors 471–476 and lasers 461–466 are coupled to a controller 495 in central office 405. Controller 495 includes one output line and one input line for each user. The pair of lines for user 401 are shown at 496, the pair of lines for user 402 are shown at 497, and the pair of lines for user 403 are shown at 498.

Data input to controller 495 for a particular user is coupled to the lasers which transmit on the wavelength assigned to that user. For example, data which is to be transmitted to user 401 is input to controller 495 on the input line of lines 496. This data is coupled to lasers 461 and 462 which transmit the data on wavelength $L_1$. The data transmitted by laser 462 arrives at user 401 on segment 410 of fiber 406. The data transmitted by laser 461 arrives at user 401 on segment 409 after having traversed segments 407 and 408.

Since each user is connected to central office 405 by two different bi-directional communication paths, each user is protected against any single break in fiber 406. Consider the case in which a break occurs which prevents light from being transmitted on segment 408. In particular, consider user 401. If the currently active detector in the interface unit 420 at user 401 is the detector that receives signals from laser 462 via segment 410, user 401 will not be affected by the break. If, on the other hand, the detector in question were the detector that received light from laser 461 via segment 409, the controller 450 in the interface unit would detect a loss of reception on segment 409. The controller 450 would then make the other detector, i.e., the detector which receives light from laser 462 via segment 410, the active detector.

It will be apparent to those skilled in the art that the controller associated with each user will similarly switch detectors if necessary to restore communication with central office 405. Hence, this embodiment of the present invention provides communication between several users and the central office on a single optical fiber while preserving the "self-healing" aspects of the embodiment shown in FIGS. 3 and 4. That is, the system automatically reconfigures itself to compensate for a single break in the fiber.

The number of users that can be accommodated on a single fiber is determined by the sensitivity of the various detectors and the amount of light generated by the various lasers. The light pipes in each of the interface units 420 divert a portion of the available light out of the fiber. If too many users are connected to a given fiber, there will be too little light for the detectors in the interface units 420 to operate. The number of users can be increased by increasing the amount of light generated by lasers 461–466.

Similarly, if beam splitters such as light pipes 490–491 are used to illuminate detectors 471–476, the amount of light detected by any given detector will be inversely related to the number of users. It will be apparent to those skilled in the art that this limitation may be removed by utilizing a device which spatially separates different wavelengths to illuminate detectors 471–476. For example, a prism or diffraction grating may be utilized. In this case, all of the light at a given wavelength will be directed to a single detector. Such an arrangement also eliminates the need for wavelength filters in front of each of the detectors. Alternatively, more powerful lasers could be included in each of the interface units 420.

In the above described embodiments of the present invention, a controller such as controller 450 selects one of the two bi-directional communication paths to be the active bi-directional communication path at any given time. It will be apparent to those skilled in the art that the self-healing feature of the present invention does not require that one communication path be so defined provided a delay is introduced into the signals in one of the detectors to compensate for different optical path lengths. In this case, the controllers can be replaced by a simple OR circuit which combines the outputs of the detectors.

Referring to FIG. 3, assume that fiber optic segment 76 is longer than fiber optic segment 78. If a delay circuit is included in detectors 88 and 102 which provides a delay equal to the difference in signal transit time between segments 76 and 78, then controllers 104 and 115 may be replaced by OR circuits. In this case, when both segments are functional, identical signals will be ORed to produce the output signal. If one segment is cut, the signal from the other segment will determine the output of the OR circuit.

Unfortunately, this simplification requires the inclusion of a time delay circuit in each detector. Further, the time delay in question must be separately set for each user. Finally, if one of the bi-directional communication paths fails because of a malfunction in a detector, the output of the OR circuit may not represent the signal on the correctly functioning communication path. For example, suppose detector 87 fails such that it puts out a continuous string of ones. Then the OR circuit will likewise produce a continuous string of ones. Hence, active switching between the two bi-directional communication paths is preferred.

The above described embodiments of the present invention utilize the same pair of wavelengths to communicate along each of the optical fiber segments. That is, any given user uses one wavelength to communicate with the central office and one wavelength to receive signals from the central office. Referring to FIG. 3, the wavelengths of lasers 83 and 84 are the same, and filters 99 and 100 are likewise the same. This arrangement is preferred because it minimizes the number of different wavelengths at which light is received and transmitted. However, it will be apparent to those skilled in the art that systems in which four different wavelengths are utilized to communicate information between each user and the central office are also possible. For example, referring to FIG. 3, user 72 could send information to the central office on segment 76 using a different wavelength from that used to send the same information on segment 78. Similarly, central office 74 could use different wavelengths to send information on segments 76 and 78 to user 72. This embodiment of the present invention will be referred to as the four wavelength embodiment below.

The descriptions of the embodiments of the present invention shown in FIGS. 2-5 have assumed that all users are receiving redundant service. If a given user does not require redundant service, that user's interface to the optical fiber need include only one transmitter and one receiver for transmitting and receiving light on one of the two segments of the optical fiber which were created by inserting the interface. If the optical distribution system utilizes one fiber segment for each non-redundant service user, then a second non-redundant service user can be connected to the other optical fiber segment.

If the embodiment of the present invention utilizes one fiber for servicing a plurality of users in the redundant service mode, i.e., the embodiment shown in FIGS. 4 and 5, a non-redundant service user can be connected by utilizing an interface unit which includes only one laser, one detector, and one "Y" shaped light pipe. For example, such an interface unit would resemble interface unit 420 shown in FIG. 5 with light pipe 424, detector 442, and laser 446 removed. A second non-redundant user could be connected to the same fiber by using an interface unit which resembles interface unit 420 shown in FIG. 5 with light pipe 422, detector 432, and laser 434 removed. By using pairs of "complementary" interfaces, the number of non-redundant users that can be connected to a single fiber is increased, since a pair of complementary interfaces removes the same amount of light from the fiber as one interface 420 used for providing redundant service. The four wavelength embodiment of the present invention described above may be utilized when both redundant and non-redundant service is provided on the same fiber.

Although the above described embodiments of the present invention have been described with reference to a telephone central office, it will be apparent to those skilled in the art that the present invention will also function in any system in which a plurality of users must be connected to a "master" user in a manner which is immune to cable breaks. Accordingly, there has been described herein a fiber optic distribution system for use in telephone systems and the like. Various modifications to the present invention will become apparent to those skilled in the art from the foregoing description and accompanying drawings. Accordingly, the present invention is to be limited solely by the scope of the following claims.

What is claimed is:

1. A fiber optic distribution system for providing communication access between a central office and a plurality of users generally in a localized area, said fiber optic distribution system comprising:

an optical fiber primary loop including one or more optical fibers, said primary loop leaving said central office, passing in the vicinity of each user of said plurality of users, and returning to said central office, and at least one or more patch means arranged in said primary loop for coupling a selected user with the central office through said primary loop, each said patch means including means for interrupting an optical fiber in said primary loop to create first and second optical fiber segments, each said optical fiber segment providing a bi-directional communication path between said user and said central office, each said patch means including first light transmitting means for transmitting light signals of a first predetermined wavelength to said central office on said first optical fiber segment and first light detecting means for receiving light signals of a second predetermined wavelength from said central office on said first optical fiber segment, said first and second wavelengths being chosen such that no two said patch means coupled to the same optical fiber utilize the same first and second wavelength.

2. The fiber optic distribution system of claim 1 wherein each said patch means further comprises second light transmitting means for transmitting light signals of a third predetermined wavelength to said central office on said second optical fiber segment and second light detecting means for receiving light signals of a fourth predetermined wavelength from said central office on said second optical fiber segment, said third and fourth wavelengths being chosen such that no two said patch means coupled to the same optical fiber utilize the same third and fourth wavelength.

3. The fiber optic distribution system of claim 2 wherein said first wavelength is the same as said third wavelength.

4. The fiber optic distribution system of claim 3 wherein said second wavelength is the same as said fourth wavelength.

5. The fiber optic distribution system of claim 2 wherein said patch means further comprises control mean, said control means, comprising:
- means for receiving electrical signals from a said user and for coupling said received signals to said first and second light transmitting means;
- means for transmitting electrical signals received on a selected one of said first or second light detecting means to said user;
- error detecting means for detecting transmission errors on the said optical fiber segment on which said selected detector detects light signals, said error detecting means including means for causing said selected one of said first and second light detecting means to be changed to the other of said first and second light detecting means when a said transmission error is detected.

6. The fiber optic distribution system of claim 5 wherein said patch means further comprises means for maintaining continuity between said first and second optical fiber segments.

7. The fiber optic distribution system of claim 1 wherein different portions of said optical fiber primary loop are substantially spaced apart to reduce the probability that an event leading to an interruption in said optical fiber primary loop will result in said optical fiber primary loop being interrupted in more than one place.

8. A method for providing communication access between a central office and a plurality of users generally in a localized area, said method comprising the steps of:
- providing an optical fiber primary loop including one or more optical fibers, said primary loop leaving said central office, passing in the vicinity of each user of said plurality of users, and returning to said central office, and
- interrupting an optical fiber in said primary loop by the insertion of at least one or more patch means therein to create first and second optical fiber segments, each said optical fiber segment providing a bi-directional communication path between said user and said central office, said patch means including first light transmitting means for transmitting light signals of a first predetermined wavelength to said central office on said first optical fiber segment and first light detecting means for receiving light signals of a second predetermined wavelength from said central office on said first optical fiber segment, said first and second wavelengths being chosen such that no two said patch means coupled to the same optical fiber utilize the same first and second wavelength.

9. The method of claim 8 wherein said patch means further comprises second light transmitting means for transmitting light signals of a third predetermined wavelength to said central office on said second optical fiber segment and second light detecting means for receiving light signals of a fourth predetermined wavelength from said central office on said second optical fiber segment, said third and fourth wavelengths being chosen such that no two said patch means coupled to the same optical fiber utilize the same third and fourth wavelength.

10. The method of claim 9 wherein said first wavelength is the same as said third wavelength.

11. The method of claim 10 wherein said second wavelength is the same as said fourth wavelength.

12. The method of claim 9 wherein said patch means further comprises control means, said control means comprising:
- means for receiving electrical signals from a said user and for coupling said received signals to said first and second light transmitting means;
- means for transmitting electrical signals received on a selected one of said first or second light detecting means to said user;
- error detecting means for detecting transmission errors on the said optical fiber segment on which said selected detector detects light signals, said error detecting means including means for causing said selected one of said first and second light detecting means to be changed to the other of said first and second light detecting means when a said transmission error is detected.

13. The method of claim 12 wherein said patch means further comprises means for maintaining continuity between said first and second optical fiber segments.

14. The method of claim 8 wherein different portions of said optical fiber primary loop are substantially spaced apart to reduce the probability that an event leading to an interruption in said optical fiber primary loop will result in said optical fiber primary loop being interrupted in more than one place.

* * * * *